March 26, 1929.　　A. E. ERICSON ET AL　　1,706,919
DEVICE FOR RAISING AN AUTOMOBILE WHEEL
AND HOLDING IT IN ITS RAISED POSITION
Filed April 16, 1927　　2 Sheets-Sheet 1
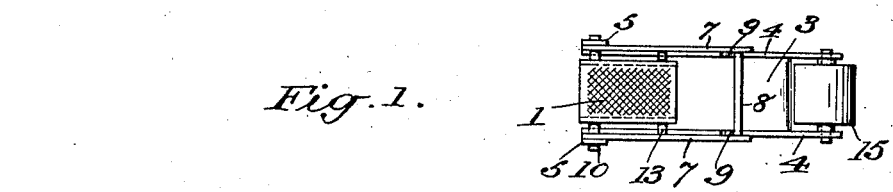
Fig.1.
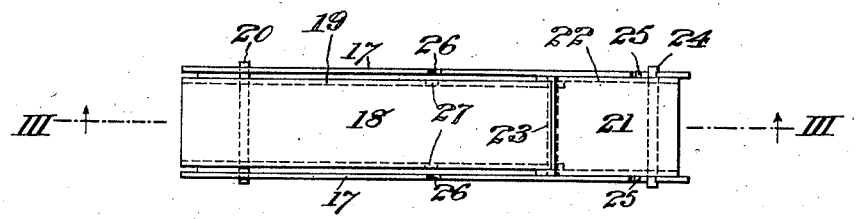
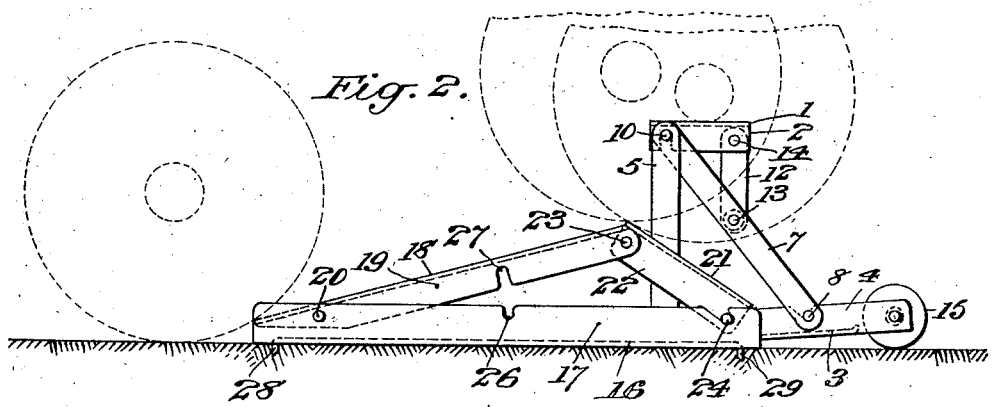
Fig.2.
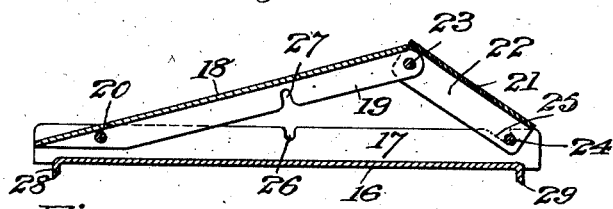
Fig.3.
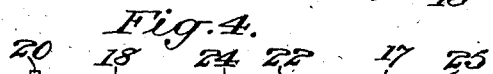
Fig.4.
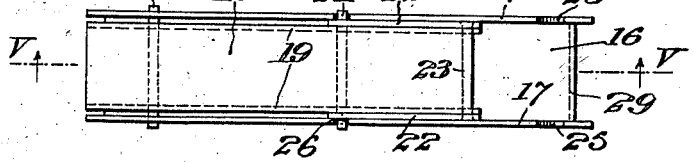
Fig.5.
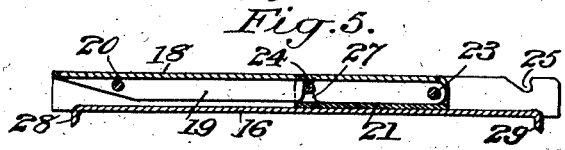
INVENTORS
Andrew E Ericson and
Alfred E Thyberg
by [signature]
ATTORNEYS

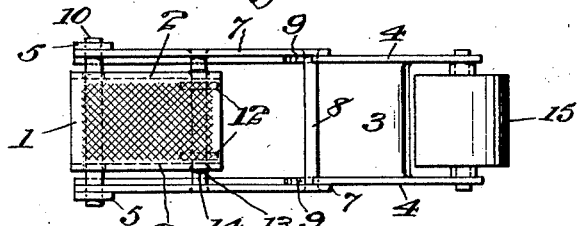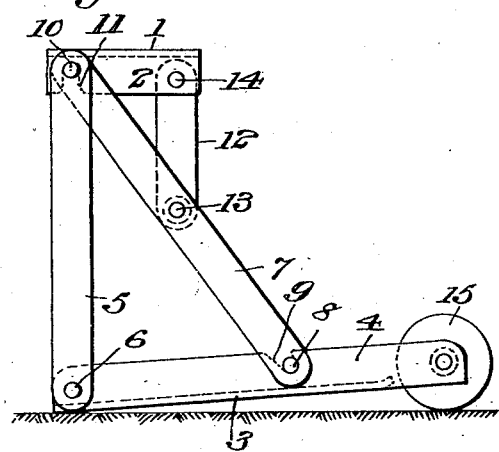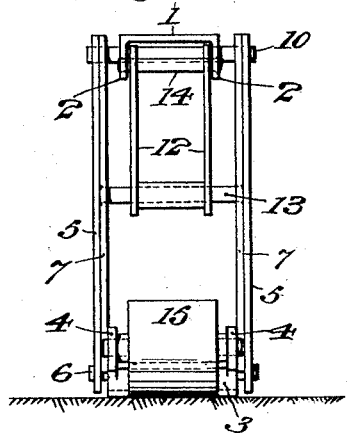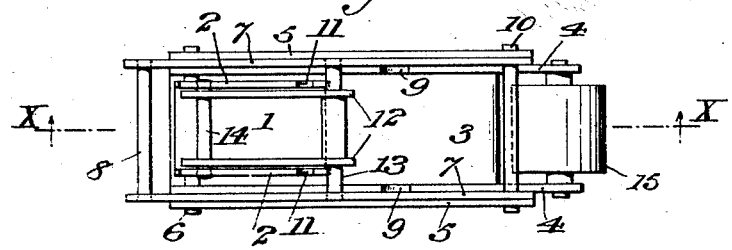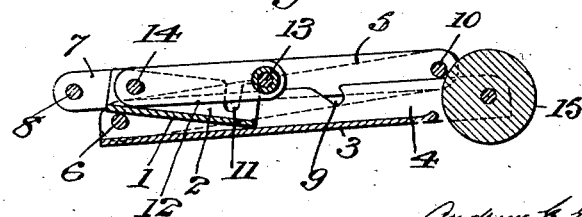

Patented Mar. 26, 1929.

1,706,919

UNITED STATES PATENT OFFICE.

ANDREW E. ERICSON AND ALFRED C. THYBERG, OF BROOKLYN, NEW YORK.

DEVICE FOR RAISING AN AUTOMOBILE WHEEL AND HOLDING IT IN ITS RAISED POSITION.

Application filed April 16, 1927. Serial No. 184,268.

The object of our invention is to provide a device for raising an automobile wheel and holding it in its raised position, which device comprises an elevated platform and an oppositely inclined runway arranged to first raise the automobile wheel as it rolls up the front incline until the axle adjacent the wheel is brought to a position above the platform and then lower the wheel as it rolls down the rear incline to direct the axle into position on the platform for holding the wheel in its raised position.

The device more particularly comprises a folding platform and a folding runway whereby they may be brought into a very compact and portable bundle for stowage when not in use.

A practical embodiment of our invention is represented in the accompanying drawings, in which Fig. 1 represents the device in top plan with the parts unfolded and in position for use.

Fig. 2 represents a side view of the same.

Fig. 3 represents a longitudinal vertical section through the runway in its unfolded position, said section being taken in the plane of the line III—III of Fig. 1, looking in the direction of the arrows.

Fig. 4 represents a plan view of the runway in its folded position.

Fig. 5 represents a longitudinal vertical section taken in the plane of the line V—V of Fig. 4, looking in the direction of the arrows.

Fig. 6 represents a top plan view of the folding platform.

Fig. 7 represents a side view of the same.

Fig. 8 represents a front view.

Fig. 9 represents a top plan view of the platform in its folded position.

Fig. 10 represents a longitudinal vertical section, taken in the plane of the line X—X of Fig. 9, looking in the direction of the arrows.

The device consists generally of the runway for the wheel and the means for engaging the axle to hold the wheel in its raised position, said means comprising generally the axle engaging platform and its folding support.

The axle engaging platform is denoted by 1, the top surface of which is preferably roughened to prevent the axle from slipping thereon. This platform is provided with the depending side flanges 2, 2. The base 3 of the folding support for the platform 1 is provided with the uprising side flanges 4, 4. The pair of vertical side members 5, 5 are pivoted at their lower ends to the base 3 by a crossbar 6, which passes through the uprising flanges 4, 4 of the base. The pair of diagonal side members 7, 7 are connected at their lower ends by a crossbar 8 which is arranged to enter open recesses 9, 9 in the uprising flanges 4, 4 of the base 3 when the parts are in their unfolded position. A crossbar 10 pivotally connects the upper ends of the vertical side members 5, 5 and diagonal side members 7, 7 which crossbar is arranged to enter open recesses 11, 11 in the depending flanges 2, 2 of the platform 1 when the parts are in their unfolded position. The lower ends of the pair of additional vertical side members 12, 12 are pivoted to the diagonal members 7, 7 by the connecting crossbar 13 and the upper ends of these additional vertical side members are pivoted to the platform 1 by the crossbar 14. This arrangement not only permits of a very rigid support for the elevated axle when the parts are in their unfolded position, but also permits the parts to be folded into a very compact bundle when not in use.

The rear end of the base 3 is cut away and a traction wheel 15 is mounted between the projecting rear ends of the uprising side flanges 4, 4 for spacing the rear end of the base slightly above the ground or other support.

The runway comprises generally a base and two oppositely inclined members as follows:

The runway base is denoted by 16 and its uprising side flanges by 17, 17. The front inclined member is denoted by 18 and its depending side flanges by 19, 19.

The lower front end of the said front inclined member 18 is pivoted to the front end of the base 16 by a crossbar 20.

The back inclined member is denoted by 21 and its depending side flanges by 22, 22. A crossbar 23 serves to hinge the upper rear end of the front member 18 to the upper front end of the back member 21. The lower rear end of the back inclined member 21 is provided with a crossbar 24 removably seated in the open recesses 25, 25 in the uprising flanges 17, 17 at the rear end of the base 16 for holding the parts in their operative position. By making the base 16 and the front and back inclined members 18 and 21 of different widths, the parts may be folded into a very compact bundle by folding one inclined member within the other inclined member and then both inclined members within the base. The side flanges 17, 17 of the base are provided with open recesses 26, 26 and the side flanges 19, 19 of the front inclined member are provided with two open corresponding recesses 27, 27 for receiving the crossbar 24 when the parts are folded. To hold the runway against unintentional movement as the automobile wheel is rolled along the same, we provide depending projections 28, 29 at the opposite ends of the base 16.

We preferably make the front inclined member 18 of greater length than the back inclined member 21 so that when the parts are in their assembled position, the front inclined member will present a less incline to the wheel than the back inclined member, whereby the wheel may be gradually raised and then rapidly lowered to bring the axle to rest on the elevated platform.

In operation: When a certain wheel of the automobile is to be raised, the runway is unfolded and placed in the path of the wheel and the platform is unfolded and placed in its proper position at the side of the runway for receiving the raised portion of the wheel axle. The automobile is then moved to first cause the wheel to roll up the front inclined member of the runway for raising the axle to a point above the platform and then roll down the back inclined member of the runway a short distance until the axle is brought to rest on the elevated platform with the wheel in its desired raised position. The roller at the rear end of the platform base permits a slight rearward movement of the platform as the axle comes into engagement therewith, thereby preventing any possibility of the axle sliding off the platform as the wheel runs down the back inclined member of the runway. As has been hereinabove pointed out, the downward projections on the runway base will prevent the unintentional movement of the runway as the wheel rolls along the same.

From the above description it will be seen that we have provided a strong yet light device which will very easily raise the wheel to be manipulated and direct its axle into position to hold the wheel raised, said device being capable of being folded into a very compact and portable bundle to be stowed away, in the automobile for instance, when not in use.

It is evident that various changes may be resorted to in the construction, form and arrangement of the several parts without departing from the spirit and scope of our invention; hence, we do not wish to be limited to the particular embodiment herein shown and described, but

What we claim is:—

1. In a device of the character described, an elevated platform, a folding support therefor, and an oppositely inclined runway arranged, as a wheel is rolled up one incline and down the other, to direct the axle onto said platform, said folding support comprising a base, vertical members pivotally connected to the base, diagonal members pivotally connected to said vertical members and removably engaging the base, and additional vertical members pivotally connected to the diagonal members and to the platform, the platform being removably engaged with the pivotal connection of said first named vertical members and said diagonal members.

2. In a device of the character described, an elevated platform, a folding support therefor, and an oppositely inclined runway arranged, as a wheel is rolled up one incline and down the other, to direct the axle onto said platform, said folding support comprising a base, vertical members, a cross bar pivotally connecting their lower ends to the base, diagonal members, a crossbar removably engaging the platform and pivotally connecting the upper ends of the said vertical and diagonal members, a crossbar connecting the lower ends of the diagonal members and removably engaged with the base, additional vertical members, and a crossbar pivotally connecting their lower ends to the diagonal members and another crossbar pivotally connecting their upper ends to the platform.

3. In a device of the character described, an elevated platform, a folding support therefor, an oppositely inclined runway arranged, as a wheel is rolled up one incline and down the other, to direct the axle onto said platform, said folding support comprising a base and collapsible side members connecting the base and platform, and a roller mounted at the rear end of the base.

4. In a device of the character described, an elevated platform, a support therefor, and an oppositely inclined folding runway arranged, as a wheel is rolled up one incline and down the other, to direct the axle onto said platform said runway comprising a base and two oppositely inclined collapsible members, said base and inclined members being U-shaped in cross section, one inclined member being foldable within the other inclined member and both inclined members being foldable within the base.

5. In a device of the character described, an elevated platform, a support therefor, and an oppositely inclined folding runway arranged, as a wheel is rolled up one incline and down the other, to direct the axle onto said platform, said runway comprising a base and two oppositely inclined collapsible members, said base and inclined members being U-shaped in cross section and of different widths in order that they may be nested compactly together, one within another.

6. In a device of the character described, an elevated platform, a support therefor, and an oppositely inclined folding runway arranged, as a wheel is rolled up one incline and down the other, to direct the axle onto said platform, said runway comprising a base and two oppositely inclined collapsible members, the lower end of one inclined member being hinged to the base and its upper end being hinged to the upper end of the other inclined member, said last named inclined member having its lower end removably engaging the base.

7. In a device of the character described, an elevated platform, a support therefor, and an opopsitely inclined folding runway arranged, as a wheel is rolled up one incline and down the other, to direct the axle onto said platform, said runway comprising a base and two oppositely inclined collapsible members, the lower end of one inclined member being hinged to the base and its upper end being hinged to the upper end of the other inclined members, said last named inclined member having its lower end removably engaging the base, said base being provided with means for holding it against slipping.

In testimony, that we claim the foregoing as our joint invention, we have signed our names this 8th day of April, 1927.

ANDREW E. ERICSON.
ALFRED C. THYBERG.